(12) United States Patent
Narumi

(10) Patent No.: US 7,448,488 B2
(45) Date of Patent: Nov. 11, 2008

(54) ABRASION SENSING TYPE CONVEYOR CHAIN AND A METHOD OF JUDGING DEGREE OF ITS ABRASION

(75) Inventor: Nobuhiro Narumi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/717,363

(22) Filed: Mar. 13, 2007

(65) Prior Publication Data

US 2007/0267275 A1 Nov. 22, 2007

(30) Foreign Application Priority Data

May 19, 2006 (JP) ............................. 2006-140872

(51) Int. Cl.
*B65G 43/00* (2006.01)
(52) U.S. Cl. .............................. 198/502.1; 198/810.01; 492/9
(58) Field of Classification Search ............... 198/502.1, 198/810.01, 835; 73/829; 356/635; 492/9–11
See application file for complete search history.

(56) References Cited

U.S. PATENT DOCUMENTS

| | | | | |
|---|---|---|---|---|
| 4,916,824 A | * | 4/1990 | Shimazutsu et al. | 33/551 |
| 5,101,982 A | * | 4/1992 | Gentili | 209/556 |
| 5,117,081 A | * | 5/1992 | Bagdal | 219/69.11 |
| 6,055,047 A | * | 4/2000 | Schweizer et al. | 356/237.1 |
| 6,244,426 B1 | * | 6/2001 | Murano et al. | 198/784 |
| 6,349,813 B1 | * | 2/2002 | Offerman et al. | 198/328 |
| 6,851,546 B2 | * | 2/2005 | Lodge | 198/502.1 |
| 7,032,740 B2 | * | 4/2006 | Hochhaus et al. | 198/502.1 |
| 7,146,850 B2 | * | 12/2006 | McCrea | 73/105 |
| 7,270,232 B2 | * | 9/2007 | Schiltz | 198/835 |

FOREIGN PATENT DOCUMENTS

JP 10-300426 11/1998

* cited by examiner

*Primary Examiner*—Douglas A Hess
(74) *Attorney, Agent, or Firm*—Dann, Dorfman, Herrell and Skillman, P.C.; Henry H. Skillman

(57) ABSTRACT

An abrasion sensing type conveyor chain, in which a degree of abrasion in a roller rolling surface is easily judged by a visual or a tactile sensing during checking and maintaining of rollers of the conveyor chain so that a maintenance operation can be significantly reduced. An abrasion sensing type conveyor chain in which rollers which travel along a guide surface while rolling on a conveyor line, each comprise a roller rolling surface with a roller outer diameter of a required standard and an abrasion limiting surface with a smaller diameter than the roller outer diameter, the abrasion limiting surface being disposed adjacently and coaxially to the roller rolling surface.

4 Claims, 3 Drawing Sheets

ABRASION SENSING TYPE CONVEYOR CHAIN AND A METHOD OF JUDGING DEGREE OF ITS ABRASION

FIELD OF INVENTION

The present invention relates to an abrasion sensing conveyor chain in which a degree of abrasion in rollers, which travel while rolling on a conveyor line, can be judged.

BACKGROUND OF THE INVENTION

A conveyor chain with rollers, which travel while rolling on a conveyor line, has been generally used for conveying transfer articles to a remotely set transfer position. Abrasion sensing means for such a conventional conveyor chain, which senses an abrasion in a roller, a bush and a pin, has been known (see, for example, Japanese Laid-Open Patent Publication No. H10-300426).

However, since in the above-mentioned abrasion sensing device of a roller chain, one end side of a pin in a roller chain is first imaged, then the center position of an image of the pin and the center position of an image of the associated roller is calculated, then a deviation between their both calculated center positions is obtained and abrasions in the roller and the like are sensed based on the obtained deviation, a high accuracy sensor and a highly developed image processing putting a CPU into full use is required. Thus although such a type of the abrasion sensing device can be used in a test room or the like, the setting up of a large-scale abrasion sensing equipment is required for adapting the abrasion sensing device to a conveyor chain set up at an actual conveying operation site and there were troublesome problems in maintenance with the result that highly advanced knowledge and operations for the image processing and the like are needed.

SUMMARY OF THE INVENTION

Accordingly, the present invention was made to solve the above-mentioned related art problems. The object of the present invention is to provide an abrasion sensing type conveyor chain, in which a degree of abrasion in a roller rolling surface is easily judged by a visual check or a tactile sensing during checking and maintaining of rollers of the conveyor chain so that a maintenance operation can be significantly reduced.

Embodiments of the invention have solved the above-mentioned problems by providing an abrasion sensing type conveyor chain in which a degree of abrasion in rollers, which travel while rolling on a conveyor line, can be judged. Specifically, the rollers comprise a roller rolling surface with a roller outer diameter of a required standard and an abrasion limiting surface with a smaller diameter than the roller outer diameter, the abrasion limiting surface being disposed adjacently and coaxially to the roller rolling surface.

The abrasion sensing type conveyor chain of a preferred embodiment of the invention sets the abrasion limiting surface at an abrasion limiting position of the roller rolling surface.

The abrasion sensing type conveyor chain of the invention may solve the above-mentioned problems by dividing the rolling surface into at least two parts with the abrasion limiting surface between the two parts of the roller rolling surface.

The method of judging a degree of abrasion in the abrasion sensing type conveyor chain of the invention has solved the above-mentioned problems by that, in the abrasion sensing type conveyor chain, a degree of abrasion of said roller rolling surface is judged by sensing the presence or absence of a step between said roller rolling surface and said abrasion limiting surface.

Since, in an abrasion sensing type conveyor chain in which a degree of abrasion in rollers, which travel while rolling on a conveyor line, can be judged, the rollers each comprise a roller rolling surface with a roller outer diameter of a required standard and an abrasion limiting surface with a smaller diameter than the roller outer diameter, the abrasion limiting surface being disposed adjacently and coaxially to said roller rolling surface, a degree of abrasion in a roller rolling surface is easily judged by sensing visually or tactilely the presence or absence of a step between a rolling surface of a roller, which travels while rolling on a conveyor line and an abrasion limiting surface indicating an abrasion allowable limit in the roller. This is accomplished without using a measuring device such as calipers or the like as in a conventional case during the check of abrasion in rollers of the conveyor chain, so that a maintenance operation can be significantly reduced.

According to the abrasion sensing type conveyor chain of the preferred embodiment of the invention, since the abrasion limiting surface is set at an abrasion limiting position of the roller rolling surface, roller replacement time can be correctively judged by the use of the abrasion limiting surface as an objective criterion or mark when an abraded roller is replaced without use of a measuring device such as calipers or the like, unlike a conventional case during the check of abrasion in rollers of the conveyor chain.

Further, according to a preferred embodiment of the invention, since said abrasion limiting surface is disposed at a position where said roller rolling surface is divided into two parts, the non-contact space between the conveyor line and the abrasion limiting surface can contain more lubricating oil than the rolling contact space between the conveyor line and a divided-into two part roller rolling surface. Thus, lubricating oil lines having different fills of lubricating oil are formed on the conveyor line. Even the presence or absence of such lubricating oil lines having different fills of lubricating oil can act as a more reliable indicator when replacing an abraded roller at the time of checking the abrasion of the rollers. The more lubricating oil contained on the abrasion limiting surface of the roller allows a smooth conveyor operation to accelerate and can contribute to an extended service life of the conveyor.

Further, according to the method of the invention, since a degree of abrasion of said roller rolling surface is judged by the presence or absence of a step between said roller rolling surface and the abrasion limiting surface in the abrasion sensing type conveyor chain, the presence or absence of the step between the roller rolling surface and the abrasion limiting surface acts as a reliable indicator when replacing an abraded roller at the time of checking the abrasion of the rollers. Therefore, the rollers of the conveyor chain can be easily, simply checked and maintained without depending on the checking know-how and experience of a skilled worker, as is required for a conventional sensing device, and the safety of the conveyor chain can be completely ensured.

An embodiment of the present invention may be used to enable judging of the degree of abrasion in rollers of an abrasion sensing conveyor chain while the chain is rolling on a conveyor line. The rollers each comprise a roller rolling surface with a roller outer diameter of a required standard and an abrasion limiting surface having a smaller diameter than the roller outer diameter, the abrasion limiting surface being disposed adjacently and coaxially to said roller rolling surface. The degree of abrasion in a roller rolling surface is easily judged by a visual check or tactilely during maintenance of rollers of the conveyor chain so that a maintenance operation can be significantly reduced.

Concrete embodiments of rollers incorporated into the abrasion sensing type conveyor chain of the present invention may be any type, e.g., a steel roller, a rubber roller, an engineering plastic roller so called as an "Enpla" roller, and the like. Particularly, the rubber roller and the engineering plastic roller are more preferable since they realize low noise conveyance.

Further, the abrasion limiting position of the roller rolling surface may be a limiting position, which indicates an abrasion limit of a roller, a boundary position between a base material of a roller and a roller rolling surface formed on the roller rolling surface by coating by being subjected to painting, plating, chemical conversion treatment or the like.

Further, regarding concrete arrangement forms of the roller rolling surface and the abrasion limiting surface in the present invention, the abrasion limiting surface may be coaxially disposed at the center position where the roller rolling surface is divided into two parts or the abrasion limiting surface may be coaxially disposed with the roller rolling surface on both sides so as to be adjacent to the roller rolling surface. In the former case, since the non-contact space between a conveyor line and an abrasion limiting surface contains more lubricating oil than the rolling contact space between a divided-into two parts roller rolling surface, lubricating oil lines having different fills of lubricating oil are formed on the conveyor lines. The more preferred arrangement is where the abrasion limiting surface is positioned between the two parts of the axially-spaced rolling surface, since even the presence or absence of the lubricating oil lines having different fills of lubricating oil acts as a reliable mark when replacing a roller at the time of checking or judging abrasion of rollers.

DESCRIPTION OF THE PREFERRED EMBODIMENTS

Figure 3:
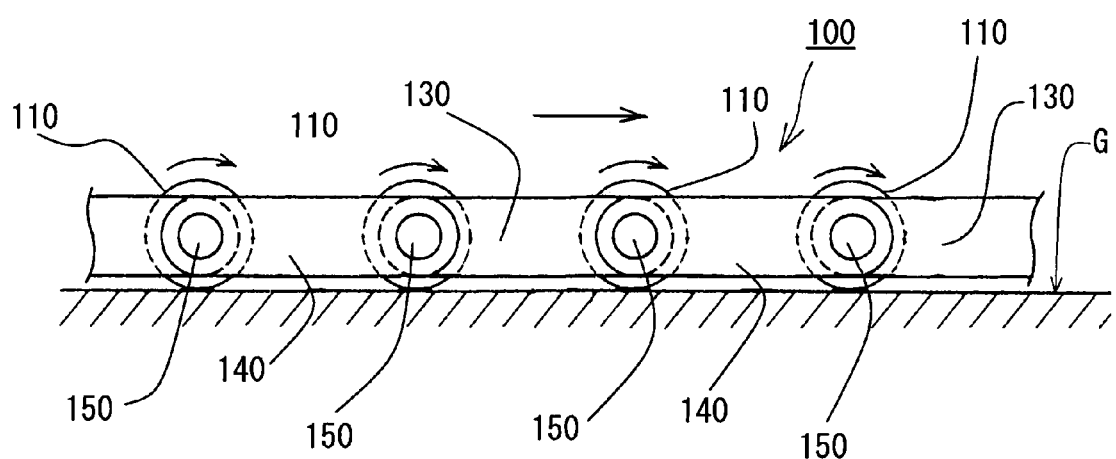
FIG. 3 is a fragmentary side view of a conveyor chain having links according to FIG. 1.

Abrasion sensing type conveyor chains, which are examples of the present invention, will be described with reference to drawings. Rollers are subject to abrasion when rolling on a guide surface G in a typical installation as shown in FIG. 3.

Figure 1:
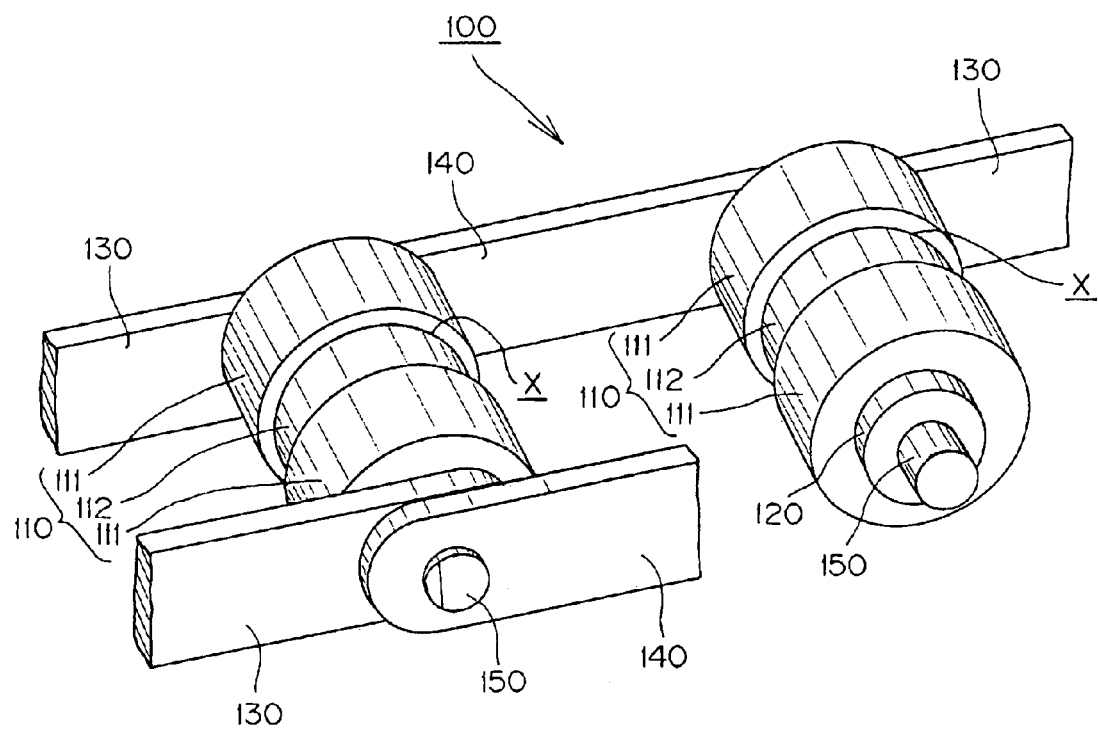
FIG. 1 is a schematic view of links of an abrasion sensing type conveyor chain, which is a first example according to the present invention.
Figure 2:
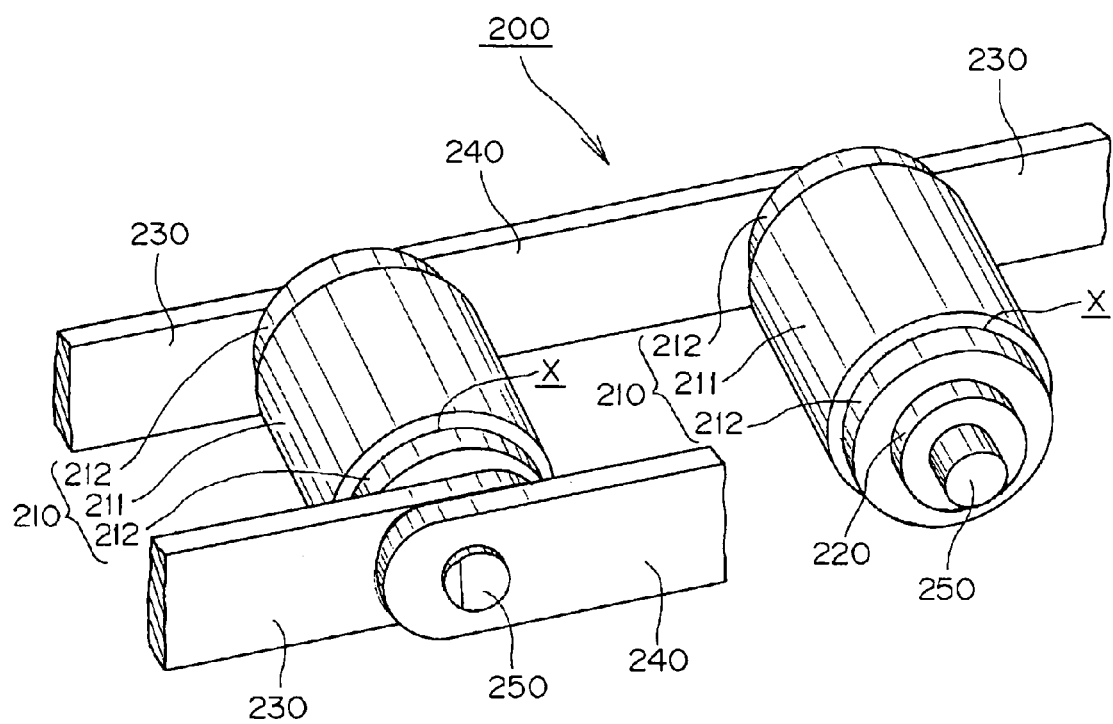
FIG. 2 is a schematic view of links of an abrasion sensing type conveyor chain, which is a second example according to the present invention.

Here, FIG. 1 is a schematic view of an abrasion sensing type conveyor chain 100, which is a first example according to the present invention, and FIG. 2 is a schematic view of an abrasion sensing type conveyor chain link 200, which is a second example of the present invention.

First, as shown in FIG. 1, in the abrasion sensing type conveyor chain link 100, which is the first example of the present invention, rollers 110 are rotatably fitted onto a bush 120 which spans between both inner plates 130 and outer plates 140. The links are connected to each other in a large number by connecting pins 150 in a longitudinal direction of the chain.

It is noted that all of the rollers 110, bushes 120, inner plates 130, outer plates 140 and the connecting pins 150 are preferably made of a steel material.

Thus, a concrete form of the most characteristic roller 110 in the abrasion sensing type conveyor chain link 100 of the present example will be described in detail.

First, as shown in FIG. 1, the roller 110 comprises roller rolling surfaces 111 each having a roller outer diameter of a required standard and an abrasion limiting surface 112 adjacent to these roller rolling surface 111 and coaxially disposed relative thereto and having smaller diameter than the outer diameter of the roller. Then a degree of abrasion of the roller rolling surfaces 111 is easily judged by a visual or a tactile sensing during checking and maintenance of rollers of the conveyor chain so that a maintenance operation can be significantly reduced.

Further, in the roller 110 used in the first example the abrasion limiting surface 112 is set at an abrasion limiting position X of the roller rolling surface 111. Roller replacement time can be correctly judged by comparison of the rolling surface 111 with the abrasion limiting surface 112 as an objective criterion or mark. An abraded roller 110 may be selected for replacement without use of a measuring device such as calipers or the like, unlike a conventional case during the check of abrasion in rollers 110 of the conveyor chain.

Further since in the roller 110 of the first example, the abrasion limiting surface 112 is disposed at a position where the roller rolling surface 111 is horizontally divided into two parts, and non-contact space between the conveyor line and the abrasion limiting surface 112 contains more lubricating oil than rolling contact space between the conveyor line and a divided-into two parts roller rolling surface 111, lubricating oil lines having different fills of lubricating oil are formed on the conveyor line. Even the presence or absence of such lubricating oil lines having different fills of lubricating oil can act as a more reliable identifier when replacing an abraded roller at the time of checking the abrasion of the rollers.

Next, an abrasion sensing type conveyor chain link 200, which is a second example according to the present invention, will be described with reference to FIG. 2.

As shown in FIG. 2, in the abrasion sensing type conveyor chain link 200, which is the second example of the present invention, rollers 210 are rotatably fitted onto a bush 220 which space between inner plates 230 and outer plates 240. These rollers links 200 are connected to each other in a large number by connecting pins 250 in a longitudinal direction of the chain.

It is noted that all of the rollers 210, bushes 220, inner plates 230, outer plates 240 and the connecting pins 250 are made of a steel material.

Thus, a concrete form of the most characteristic roller 210 in the abrasion sensing type conveyor chain link 200 of the second example will be described in detail.

That is as shown in FIG. 2, since in the roller 210 abrasion limiting surfaces 212 are coaxially disposed on both sides of a roller rolling surface 211 so as to be adjacent thereto, and are set at abrasion limiting positions of the roller rolling surface 211, roller replacement time can be correctively judged by a visual or a tactile sensing using the limiting surfaces 212 as an objective criterion or indicator. An abraded roller 210 may be replaced without use of a measuring device such as calipers or the like unlike a conventional case during the check and maintenance of abrasion in rollers 210 of the conveyor chain, so that a maintenance operation can be significantly reduced.

In the thus obtained abrasion sensing type conveyor chains, which are the first and second examples, since the roller comprises a roller rolling surface with a roller outer diameter of a required standard and an abrasion limiting surface with a smaller diameter than the roller outer diameter. The abrasion limiting surface is disposed adjacently and coaxially to the roller rolling surface, and the abrasion limiting surface is set at an abrasion limiting position of the roller rolling surface, roller replacement time can be correctively judged by a visual or a tactile sensing using the limiting surfaces as an objective criterion or indicator when an abraded roller is to be replaced during checking maintenance of the conveyor chain, so that a maintenance operation can be significantly reduced. Thus, the beneficial results of the present invention are very large.

The invention claimed is:

1. An abrasion sensing conveyor chain adapted for use in a conveyor line having a guide surface, said chain facilitating the judging of the degree of abrasion in rollers while installed on the line, said conveyor chain comprising a series of links having at least two spaced-apart link plates, at least one bush spanning between said two spaced-apart link plates, connecting pins connecting the link plates of each link to the link plates of adjoining links, and a roller rotatably mounted on each bush to support the chain on the guide surface of the conveyor line, at least one roller of one link of said series comprising a one-piece roller with an exposed first roller surface with an outer diameter of a required standard, and an exposed second surface with a diameter smaller than said outer diameter, said exposed second surface being disposed adjacent to and coaxial with said exposed first roller surface, whereby judging wear on the outer exposed first surface may be done by comparing the diameter of the first exposed surface with the diameter of the exposed second surface, said smaller diameter of the exposed second surface providing an abrasion limiting surface which indicates that the abrasion of the outer diameter of said first roller surface has reached the limit where the roller should be replaced.

2. An abrasion sensing conveyor chain according to claim 1 wherein said first roller surface comprises two coaxial parts which are spaced apart axially, said second surface being disposed between said two parts.

3. An abrasion sensing conveyor chain according to claim 1 wherein said second roller surface comprises two coaxial parts which are spaced apart axially, said first surface being disposed between said two parts.

4. A method of judging the degree of abrasion in a roller chain installed in a conveyor line having a guide surface, comprising the steps of providing a roller chain having a series of links having at least two spaced-apart link plates, at least one bush spanning between said two spaced-apart link plates, connecting pins connecting the link plates of each link to the link plates of adjoining links, and a roller rotatably mounted on each bush to support the chain on the guide surface of the conveyor line, at least one roller of one link of said series comprising a one-piece roller with an exposed first roller surface with an outer diameter of a required standard, and an exposed second surface with a diameter smaller than said outer diameter, said second surface being disposed adjacent to and coaxial with said first roller surface, thereby providing a step between said surfaces, said smaller diameter of the exposed second surface providing an abrasion limiting surface which indicates that the abrasion of the outer surface of the first exposed roller surface has reached the limit where the roller should be replaced, and judging the degree of abrasion in the first roller surface, by sensing the height of the step and thereby the amount of difference in diameter between said first and second surfaces.

* * * * *